United States Patent [19]

Smith

[11] Patent Number: 4,969,690
[45] Date of Patent: Nov. 13, 1990

[54] TRACTOR TRAILER QUICK-CHANGE APPARATUS

[76] Inventor: James E. Smith, Star Route 2, Box 563, Maricopa, Calif. 93252

[21] Appl. No.: 329,944

[22] Filed: Mar. 29, 1989

[51] Int. Cl.[5] .............................................. B60P 3/42
[52] U.S. Cl. .................................. 298/17 R; 296/35.3
[58] Field of Search ........................... 298/17 R, 1 A; 280/418.1, 415.1, 433; 296/184, 35.1, 35.3

[56] References Cited

U.S. PATENT DOCUMENTS

| | | | |
|---|---|---|---|
| 1,442,769 | 1/1923 | Jackson | 296/35.3 |
| 2,151,640 | 3/1939 | Menning | 296/35.3 |
| 3,791,644 | 2/1974 | Self et al. | 280/124 F |
| 3,836,178 | 9/1974 | Ham | 280/415 B |
| 3,841,511 | 10/1974 | Haun | 214/516 |
| 4,000,924 | 1/1977 | Blasingame | 296/35 |
| 4,078,818 | 3/1978 | Donnelly | 280/415 B |
| 4,141,568 | 2/1979 | Donnelly | 280/415 B |
| 4,662,670 | 5/1987 | Kemner | 296/35.3 |
| 4,702,510 | 10/1987 | Davis | 296/35.3 |

FOREIGN PATENT DOCUMENTS 922238 3/1963 United Kingdom ............. 296/35.3

Primary Examiner—Joseph F. Peters, Jr.
Assistant Examiner—Clifford T. Bartz
Attorney, Agent, or Firm—Poms, Smith, Lande & Rose

[57] ABSTRACT

A conversion apparatus suitable for mounting a truck bed onto the chassis of a tractor equipped with a fifth wheel and primarily intended for hauling trailers. In one embodiment the conversion apparatus includes a pair of rails mounted on opposing sides of the trailer chassis in front of the fifth wheel and a frame, attached to the underside of the truck bed, which is configured to rest upon the rails, the fifth wheel and a portion of the tractor chassis behind the fifth wheel. The frame is also provided with a kingpin to engage the locking mechanism of the fifth wheel. Latching devices are provided at a forward end of the rails and a rearward end of the frame to secure the front of the frame to the rails and the rear of the frame to the rearward end of the tractor chassis, thus restricting relative motion between the truck bed and the trailer. In an alternative embodiment a dump-type truck bed may be mounted on a conventional tractor. This embodiment includes a pair of rails mounted to the tractor chassis in front of the fifth wheel, a main frame connected to the underside of the dump-type truck bed, and a sub-frame, pivotally coupled at its rearward end to the main frame, which is configured to engage rails, the fifth wheel of the tractor and a portion of the tractor chassis behind the fifth wheel.

19 Claims, 3 Drawing Sheets

TRACTOR TRAILER QUICK-CHANGE APPARATUS

BACKGROUND OF THE INVENTION

1. Field of the Invention

The present invention relates generally to tractors having a fifth wheel for hauling cargo trailers and, more particularly, to conversion apparatus for adapting such a tractor to carry a truck bed or like body.

2. Description of the Prior Art

Throughout most of the United States, tractor trailer combinations are commonly used to transport large and, usually, very heavy loads over conventional highways. These tractor trailer combinations typically include a ten-wheeled tractor hauling an eight-wheeled cargo trailer. The trailer is usually towed by resting on a large metal plate, commonly called a fifth wheel, mounted onto the chassis of the tractor. This fifth wheel normally has a slot oriented towards the rear of the tractor and a locking mechanism which engages a large pin, called a kingpin, mounted onto the underside of the trailer. When the fifth wheel engages the kingpin, the locking mechanism secures the pin within the slot of the fifth wheel so as to prevent removal of the kingpin while allowing rotational movement between the tractor and the trailer, thus facilitating towing. Standardization of the fifth wheel and kingpin is fairly common in the transport industry, allowing various types of tractors to haul differing trailer configurations.

Quite often tractors are owned by private individuals who broker their hauling services to various businesses. One of the disadvantages of this entrepreneurial industry, however, is a general inability to use the tractors for other than hauling very large trailers. Several attempts have been made to provide an apparatus for adapting a conventional tractor to carry some type of truck bed so that the tractor may be useful for purposes other than hauling trailers. For example, U.S. Pat. No. 4,702,510 to Davis discloses a flat-bed for demountable attachment to the fifth wheel of a conventional tractor. The flatbed is provided with a kingpin to engage the fifth wheel of a tractor and chains are used to secure the flatbed to the tractor chassis. This approach, however, provides a somewhat precarious mounting between the tractor and the truck bed, thus limiting the stability of the combination tractor-truck bed when hauling heavy loads over rough terrain, such as might be encountered at a construction site. Another example of a tractor-conversion apparatus is illustrated in U.S. Pat. No. 4,662,670 to Kemner. In this approach, a pair of rods are welded transversely to the tractor chassis behind the fifth wheel so as to engage a truck bed having a kingpin and a pair of adjustable hangers suspended from the rearward underside of the truck bed. While apparently providing adaptability to a variety of truck beds, this approach balances the load of the truck bed onto only the three supports of the fifth wheel and the two rods welded to the tractor chassis. Thus, this approach also provides an undesirably precarious mounting structure which may not be suitable for hauling small but otherwise heavy loads.

All of the conversion apparatus discussed above suffer from several disadvantages, such as a need for intricate mechanical linkages and an unsatisfactorily precarious attachment between the truck bed and the tractor chassis. The present invention overcomes these disadvantages.

SUMMARY OF THE INVENTION

In general terms the present invention provides a conversion apparatus suitable for adapting most conventional tractors to carry a variety of truck beds. The apparatus provides a very stable and secure mounting between the truck bed and the chassis which does not interfere with the normal use of the tractor for towing conventional trailers. The apparatus also permits quick and simple conversion of the tractor from a trailer hauling configuration to a truck bed-carrying configuration.

More specifically, the conversion apparatus of the present invention includes a pair of rails mounted to opposing sides of the tractor chassis in front of the fifth wheel and a frame, attached to the underside of a truck bed, configured to rest upon the rails, the fifth wheel and a portion of the chassis behind the fifth wheel. A kingpin is also mounted on the underside of the frame to engage the fifth wheel. In one presently preferred embodiment, the conversion apparatus of the present invention further includes latching devices for securing a forward end of the frame to the rails and a rearward end of the frame to the tractor chassis.

An alternative embodiment of the present invention can also be used to mount a dump-type truck bed onto a conventional tractor. This embodiment also includes a pair of rails mounted to the tractor chassis, a main frame attached to the underside of the dump-type truck bed and a sub-frame, pivotally coupled at its rearward end to the main frame, configured to rest on the rails, the fifth wheel of the tractor and a portion of the tractor chassis behind the fifth wheel. Forward and rearward latching devices are also included to secure the front and rear ends of the sub-frame to the rails and the tractor chassis.

The novel features of the present invention will be better understood from the following detailed description, considered in connection with the accompanying drawings, wherein like numbers designate like elements. It should be understood, however, that the drawings are for purposes of illustration and description only and are not intended as a definition of the limits of the present invention.

DETAILED DESCRIPTION

Figure 1:
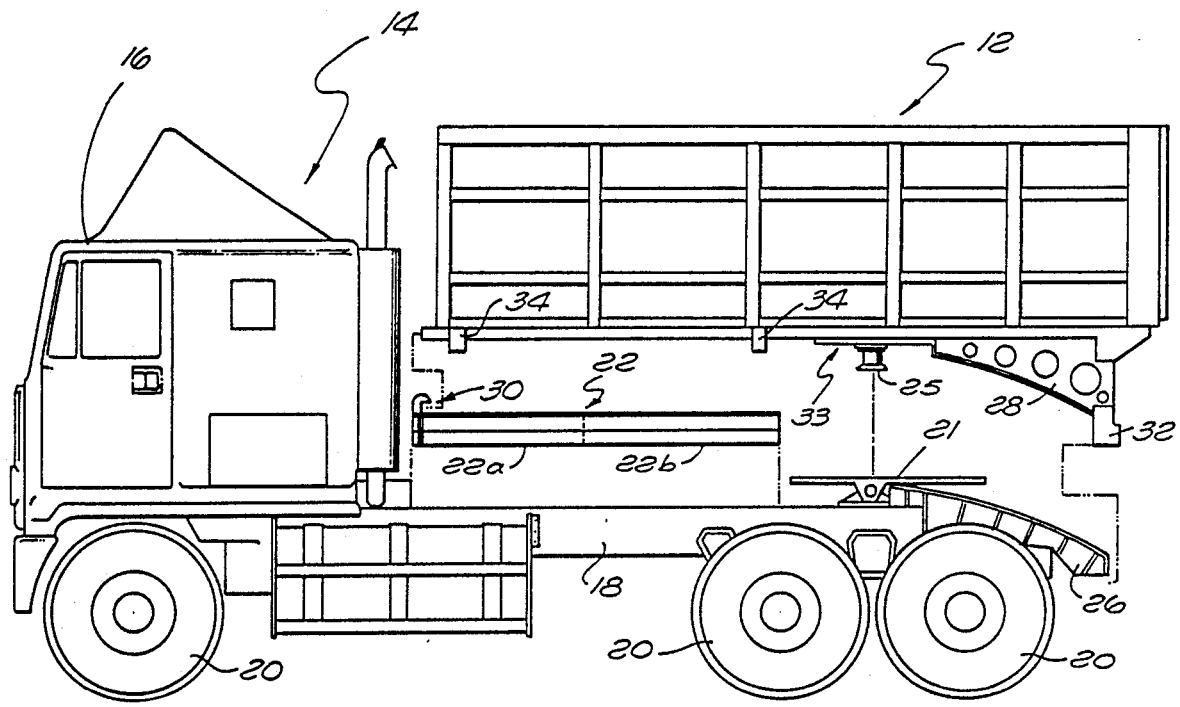
FIG. 1 is a partially exploded side-view of one embodiment of the present invention.

Referring to the Figures, and more particularly FIG. 1, there is shown one embodiment of the present invention suitable for mounting a truck bed 12 onto a conventional tractor 14 of a type primarily intended to haul trailers (not shown). While the truck bed 12 illustrated is a generally open-ended box-type body, it should be understood that other configurations could also be employed, such as, for example, a fluid container or cement mixing body. The tractor 14 includes an engine and cab 16 mounted onto a chassis 18 which is supported on ten wheels 20. A fifth wheel 21 is also mounted onto the tractor chassis 18 toward the rear of the tractor 14. As shown, the conversion apparatus of the present invention includes a pair of rails 22 attached to opposing sides of the chassis 18 in front of the fifth wheel 21, and a frame 24 attached to the underside of the truck bed 12. A kingpin 25 is also mounted onto the frame 24 to engage the fifth wheel 21.

In use, the frame 24 rests upon the rails 22, the fifth wheel 21 and a portion 26 of the tractor chassis 18, sometimes called a low-bed ramp, to the rear of the fifth wheel 21. In the embodiment illustrated in FIG. 1, the frame 24 further includes a pair of extensions 28 between portions of the frame 24 attached to the rearward end of the truck bed 12 and the low-bed ramp 26 of the chassis 18. This arrangement provides a generally even distribution of the weight of the truck bed 12, and its load, along most of the length of the tractor chassis 18 behind the cab 16.

As further illustrated in FIG. 1, and more clearly shown in FIGS. 2-5, a forward latch-up device 30 is attached to the end of each rail 22 near the cab 16. These latch-up devices 30 engage the forward ends of the frame 24 so as to secure the front-end of the truck bed 12 to the rails 22 and, hence, to the tractor chassis 18. Similarly, a rear latch-up device 32 is attached to each of the frame extensions 28 to engage the ends of the low-bed ramps 26 of the chassis 18 and thus secure the rearward end of the truck bed 12 to the tractor chassis 18. This arrangement provides a sturdy connection between the four end-corners of the truck bed 12 and the tractor 14, thus enhancing the overall stability of the truck bed and tractor combination and minimizing the likelihood of separation when the combined truck bed 12 and tractor 14 are driven over rough terrain.

The rails 22 are attached to the upper surface of the tractor chassis 18 and may be made from a variety of simply configured materials to minimize the expense of the conversion apparatus such as, for example, I-beams. The rails 22 may also be split into two separate segments, a forward rail 22a welded or otherwise permanently attached to the chassis 18 near the cab 16 so as to enhance the structural strength of the chassis 18 and a rearward rail 22b attached to the chassis 18 between the forward rail 22a and the fifth wheel 21. Preferably, though not necessarily, the rearward rails 22b are removably attached to the chassis 18, for example with bolts, so that interference with a subsequent use of the tractor 18 for towing a trailer may be avoided by removing the rearward rails 22b.

The frame 24 is also made from any desired configuration of simple bar stock which may, but need not, have a generally rectangular cross-sectional configuration such as, for example, an I-beam or hollow square rod stock. The frame 24 has a generally rectangular shape with a length extending along the entire length of the truck bed 12 and a width to match the spacing of the rails 22 mounted onto the tractor chassis 18. If desired, the frame 24 may be removably attached to the underside of the truck bed 12. Alternatively, however, the frame 24 may be welded directly onto the underside of the bed 12, thus re-enforcing the structure of the underside of the truck bed.

The forward end of the frame 24 preferably extends slightly beyond the forward end of the truck bed 12 to better engage the forward latch-up devices 30 without interference with the truck bed 12. To support the frame 24 on the fifth wheel 21, the kingpin 25 is mounted onto a plate 33 attached to the frame 24. Several guide plates 34 are also attached to the outward facing sides of the frame 24 and extend downward from the frame 24 so that the plates 34 are positioned alongside the rails 22 when the truck bed 12 is mounted onto the tractor 12. These guide plates 34 facilitate the process of mounting the truck bed 12 onto the tractor 14 by aligning the frame 24 with respect to the rails 22 and additionally enhance the stability of the combined bed 16 and tractor 14 by discouraging relative motion between the frame 24 and the rails 22 transverse to a longitudinal axis of the tractor 14.

Figure 2:
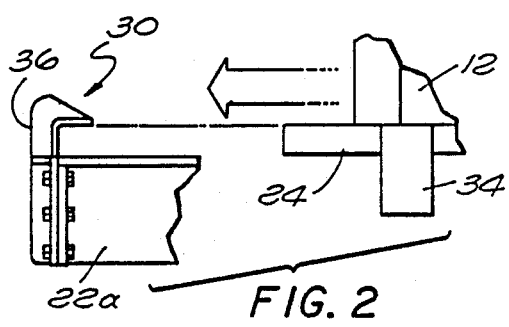
FIG. 2 is an exploded side-view of a forward latch-up structure of the present invention.
Figure 4:
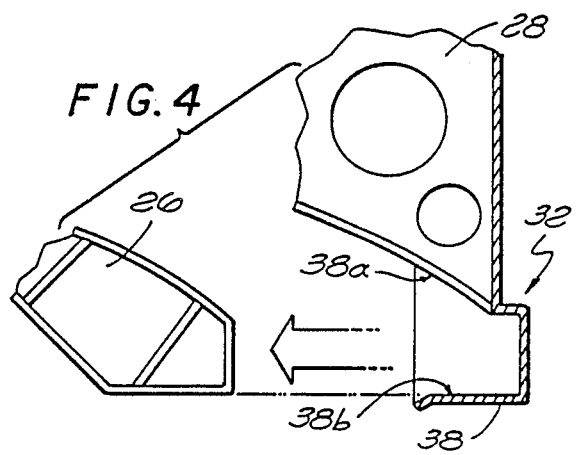
FIG. 4 is an exploded side-view of a rear latch-up structure of the present invention.
Figure 3:
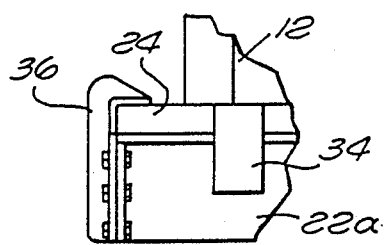
FIG. 3 is a side-view of the forward latch-up structure of FIG. 2 engaging the rails.
Figure 5:
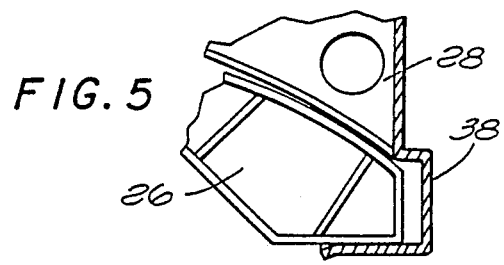
FIG. 5 is a side-view of the rear latch-up structure of FIG. 4 engaging the tractor frame.

As shown more clearly in FIGS. 2 and 3 the forward latch-up devices 30 each include a hook 36 attached to the forward end of each of the rails 22 so as to retain the leading edge of the frame 24 against the rails 22 when the truck bed 12 is mounted onto the tractor 14. If the frame 24 is made from bar stock having a hollow interior, the hooks 36 may alternatively be shaped as conic sections configured to project into the leading edges of the frame 24 and thus retain the frame 24 against the rails 22. The rear latch-up devices 32, shown more fully in FIGS. 4 and 5, each include a hollow member 38 having a forward facing opening configured to receive the rearward directed ends of the low-bed ramp 26. Preferably, though not necessarily, the upper and lower interior surfaces 38a and 38b of the hollow member 38 are slightly tapered so as to compress the top and bottom edges of the low-bed ramp 26, as the ends of the ramp 26 are seated within the members 38. This arrangement provides a tight friction fit between the low-bed ramp 26 and the rear latch-up devices 32, thus assuring a more secure mounting between the rear of the truck bed 12 and the tractor 14.

The forward and rear latch-up devices 30 and 32, respectively, while providing a secure connection between the truck bed 12 and the tractor 14, also facilitate the process of mounting the truck bed 12 onto the tractor 14. This process requires little more than lifting the forward end of the truck bed 12 to the height of the tractor chassis 18 and backing the tractor 14 underneath the truck bed 12. As the tractor 14 completes the step of sliding under the truck bed 12, the leading edges of the frame 24 will slide under the hooks 36 of the forward latch-up device 30 and the rearward-facing ends of the low-bed ramp 26 will slide into the hollow members 38 of the rear latch-up devices 32. The mounting process is completed by the kingpin 25 engaging the locking mechanism of the fifth wheel 21. Once the kingpin 25 is locked within the fifth wheel 21, movement of the truck bed 12 with respect to the longitudinal axis of the tractor 14 is precluded. Thus, the leading edges of the frame 24 cannot slide out from under the hooks 36 of the forward latch-up devices 30 and the rearward-facing ends of the low-bed ramp 26 cannot be displaced from the hollow members 38 of the rear latch-up devices 32. The forward and rear latch-up devices 30 and 32, respectively, enhance the stability of the truck bed 12 and tractor 14 combination by preventing both pitching and yawing motion of the truck bed 12 transverse to the longitudinal axis of the tractor 14 as well as rolling motion about this axis.

Figure 6:
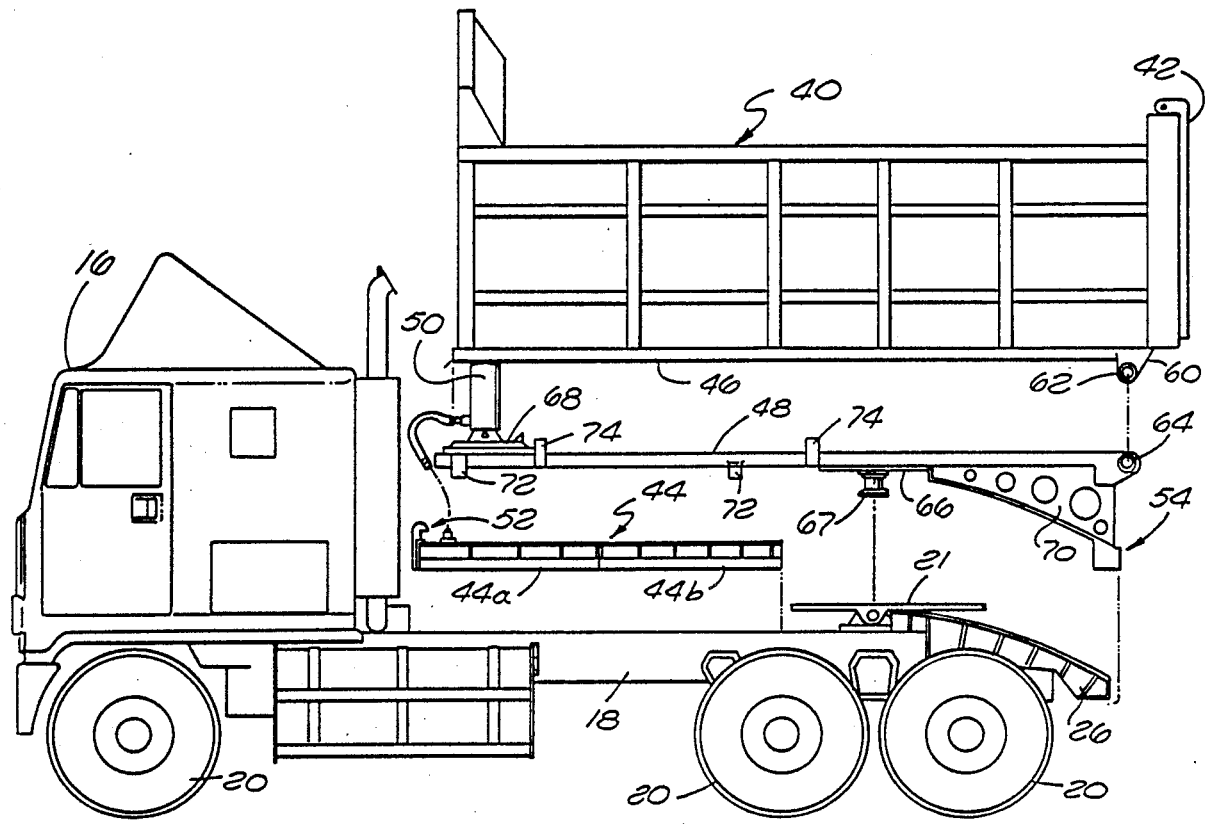
FIG. 6 is a partially exploded side-view of another embodiment of the present invention suitable for mounting a dump-type truck bed onto a tractor.
Figure 7:
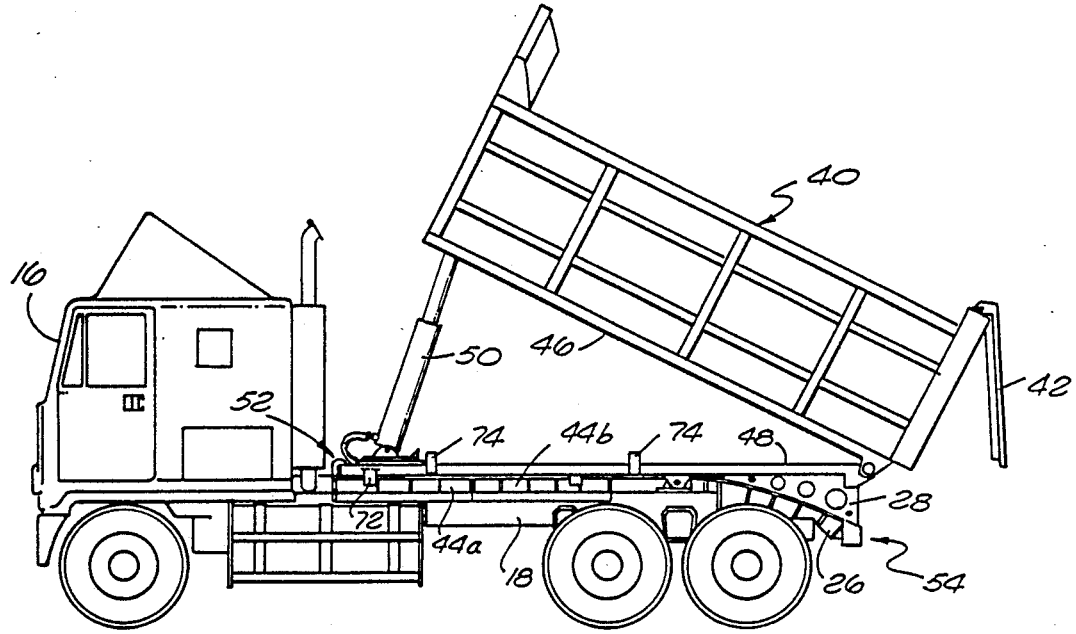
FIG. 7 is a side-view of the embodiment illustration in FIG. 6 with the dump-type truck bed mounted onto the tractor and oriented in a tilted position.
Figure 8:
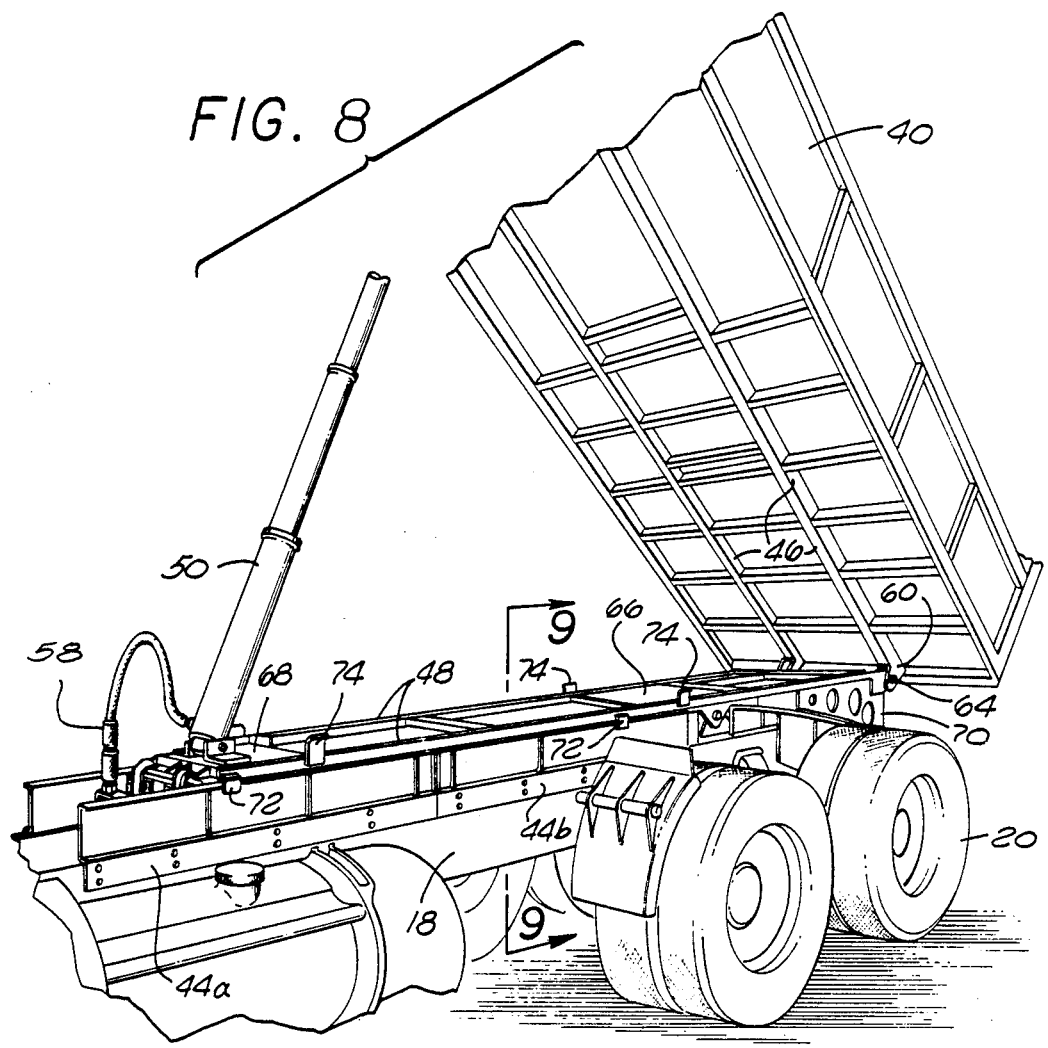
FIG. 8 is a perspective view of the embodiment illustrated in FIG. 6.

Referring to FIGS. 6–9, there is shown a second embodiment of the present invention suitable for mounting a dump-type truck bed 40 onto a conventional tractor 14 including chassis 18 having a low-bed ramp 26 and supporting a fifth wheel 21 behind the cab 16. The dump-type truck bed 40 may be any type of rectangular, open-boxed body with a tailgate 42. As shown in FIGS. 6 and 7, this embodiment includes a pair of rails 44 mounted onto the tractor chassis 18, a main frame 46 attached to the truck bed 40 and a sub-frame 48 pivotally coupled to the rear of the main frame 46. A hydraulic apparatus 50 is also attached to the forward end of the main frame 46 and the sub-frame 48 to pivot the main frame 46 in a vertical plane with respect to the sub-frame 48 and thus effectuate dumping of a load carried in the truck bed 40. Forward latch-up devices 52 and rear latch-up devices 54 are also provided to secure the sub-frame 48 to the front of the rails 44 and the rearward end low-bed ramp 26 of the tractor chassis 18.

Figure 9:
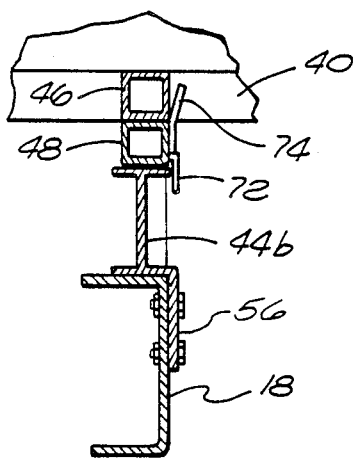
FIG. 9 is a sectional-end view of the embodiment illustrated in FIG. 6 with the dump-type truck bed mounted onto the tractor in a horizontal position.

This embodiment of the present invention incorporates the advantages discussed above concerning stability and ease of mounting the truck bed while additionally providing an apparatus for pivoting the truck bed with respect to the tractor so as to permit the use of the combination in applications suitable for dump trucks. The rails 44 shown in FIGS. 6 and 7 may, as previously discussed, be made from simple I-beams. Alternatively, however, metal plates 56 may be attached to the lower edges of the beam to provide additional structural stability and facilitate attaching the rails 44 to the chassis 18, as shown in FIG. 9. As discussed in connection with the previous embodiment, the tractor chassis 18 may be reinforced by splitting each of the rails 44 into a forward rail 44a permanently welded or otherwise attached to the tractor chassis 18 near the cab 16 and a removable rear rail 44b bolted or otherwise detachably connected to the chassis 18 behind the forward rails 44a and in front of the fifth wheel 21. A fluid-quick disconnect 58 may also be attached to one of the forward rails segments 44a to facilitate hook-up of the hydraulic apparatus 50 to fluid-pumping devices mounted on the tractor 14.

The main frame 46 attached to the dump-type truck bed 40 is also made from simply-shaped bar stock and has a generally rectangular configuration with a width matching the spacing between the rails 44. Preferably the main frame 46 has a length slightly shorter than the dump-type truck bed 40 with the rearward end of the main frame 46 positioned slightly in front of the rearward end of the truck bed 40 so that material dumped out of the truck bed 40 will be less likely to fall on the rearend of the tractor 14. The main frame 46 may either be removably attached to the underside of the truck bed 40 or permanently attached to the truck bed 40 in order to increase its structural stability. In order to provide pivotal coupling between the main frame 46 and the sub-frame 48, the rearward end of the main frame 46 forms two pairs of downwardly-projecting plates 60 forming apertures 62 aligned with one another along a generally horizontal axis, transverse to a longitudinal axis of the tractor 14. These apertures 62 engage a pair of rods 64 projecting from the rear of the sub-frame 48.

The sub-frame 48 is configured to rest on the rails 44, the fifth wheel 21 and the low-bed ramp 26 of the chassis 18. Like the main frame 46, the sub-frame 48 also has a generally rectangular shape with a width approximately the same as the spacing between the rails 44. Preferably, however, the forward edge of the sub-frame 48 extends slightly beyond the front of the truck bed 40 to engage the forward lock-up devices 52 without interference. A plate 66 is attached towards the rear of the sub-frame 48 to support a kingpin 67 and another plate 68 is attached near the front of the sub-frame 48 to support the base of the hydraulic apparatus 50. The sub-frame 48 also includes a pair of extensions 70 to support the rearward end of the sub-frame 48 on the low-bed ramp 26 of the tractor chassis 18. As discussed above in connection with the previous embodiment, the rear lock-up devices 54 may include a pair of hollow members configured to receive the rearward facing ends of the low-bed ramp 26. In order to facilitate alignment of the sub-frame 48 with respect to the rails 44 when the truck bed 40 is in the process of being mounted onto the tractor 14 and, additionally, to restrict motion of the sub-frame 48 with respect to the rails 44 transverse to a longitudinal axis of the tractor 14, the sub-frame 48 further includes one or more pair of downwardly-projecting guide plates 72. One or more pairs of upwardly-projecting guide plates 74 are also attached to the sub-frame 48 to align the main frame 46 with respect to the sub-frame 48 and restrict relative motion of the main frame 46 and the truck bed 40 with respect to the sub-frame 48 and the tractor chassis 18.

The process of mounting the dump-type truck bed 40 onto the tractor 14 is essentially the same procedure discussed above in connection with the previous embodiment. If the main frame 46 is not permanently attached to the truck bed 40, the main frame 46 and sub-frame 48 are first connected to the truck bed 40 and the forward edge of the sub-frame 48 is raised to the height of the tractor chassis 18. The tractor is then backed under the truck bed 40 until the kingpin 67 of the sub-frame 48 engages the locking mechanism of the fifth wheel 21. The hydraulic apparatus 50 may then be coupled to the tractor 14 via the quick-disconnect 58 and mounting is completed. Demounting the truck bed 40 is also easily achieved by first disconnecting the hydraulic apparatus 50 and unlocking the kingpin 67. The tractor 14 is then simply driven out from under the truck bed 40.

In the embodiment illustrated in FIGS. 6–9, a very secure and stable mounting between the truck bed 40 and the tractor 14 is achieved through the attachment between the main frame 46 and the sub-frame 48 and through the attachment of the sub-frame 48 to the forward latch-up devices 52, the fifth wheel 21 and the rear latch-up devices 54. When the dump-type truck bed 40 is in a generally horizontal position, the weight of the truck bed 40, and its load, is generally evenly distributed along the tractor chassis 18 to the rear of the cab 16. As the dump-type truck bed 40 is raised in a vertical plane, a larger portion of the load is distributed to the rear of the tractor chassis through the pivotal coupling between the main frame 46 and the sub-frame 48. The forward latch-up devices 52 and the engagement between the kingpin 67 and locking mechanism of the fifth wheel 21 then prevent rotation of the sub-frame 48 with respect to the tractor chassis.

From the above discussion it is clear that the present invention provides a novel conversion apparatus suitable for adapting conventional trailer-towing tractors to mount a variety of truck beds. The conversion apparatus of the present invention, while providing a highly stable and secure mounting between the truck bed and the tractor, also permits quick and efficient conversion of the tractor from a trailer-hauling configuration to a truck-bed carrying configuration. It will, of course, be understood that modifications to the above-described conversion apparatus will be apparent to others skilled in the art. For example, the extensions 70 of the sub-frame 48 in the embodiment illustrated in FIGS. 6–9 may be eliminated in tractor chassis configurations which do not include a low-bed ramp 26. The rear latch-up devices 54 could also be configured to engage the ends of the tractor chassis 18 housing a variety of differing cross-sectional shapes. Accordingly, the scope of the present invention is not limited by the particular embodiments or the description above, but is defined only by the claims set forth below and equivalents thereof.

What is claimed is:

1. A conversion apparatus for adapting a tractor, having a chassis and a fifth wheel for hauling trailers, to transport a truck bed, comprising:
   at least two rails attached to the tractor chassis ahead of the fifth wheel;
   a frame configured to engage the truck bed and to rest on the rails; and
   a kingpin, attached to the frame, configured to engage the fifth wheel, wherein a tractor suitable for towing heavy-load trailers can be converted to carry the truck bed with the weight of the truck bed supported by the tractor chassis along the length of the bed.

2. The conversion apparatus of claim 1 further comprising rear latch-up means, attached to the frame, for securing a rearward end of the frame to the tractor chassis.

3. The conversion apparatus of claim 2 wherein said rear latch-up means includes a hollow segment attached to the rearward end of the frame and having a tapered interior configured to receive and to compress the tractor chassis rearward end.

4. The conversion apparatus of claim 1 wherein said rails are each divided into a first member detachably mounted to the tractor chassis proximate the fifth wheel and a second member secured to the chassis adjacent said first member.

5. The conversion apparatus of claim 1 further comprising guide plates attached to the sides of the frame and projecting alongside the rails.

6. Conversion apparatus for adapting a trailer-towing tractor having a chassis and a fifth wheel to carry a truck bed, comprising:
   a pair of rails attached to the tractor frame forward of the fifth wheel;
   a main frame configured to engage the truck bed;
   a sub-frame, pivotally coupled at a rearward end to the main frame and having a bottom portion configured to rest on the rails; and
   a kingpin, attached to the sub-frame, engaging the fifth wheel when the sub-frame is seated on the tractor, wherein the trailer-towing tractor can alternatively mount a truck bed and tow a trailer.

7. The conversion apparatus of claim 6 further comprising dump means for pivoting the main frame with respect to the sub-frame, wherein the truck bed can be pivoted about the tractor chassis in a generally vertical plane.

8. The conversion apparatus of claim 6 further comprising forward latch-up means, attached to the rails, for securing a forward end of the sub-frame to the rails.

9. The conversion apparatus of claim 6 further comprising rear latch-up means, attached to the sub-frame, for securing a rearward end of the sub-frame to the tractor chassis.

10. The conversion apparatus of claim 9 wherein said rear latch-up means includes an open member attached to the sub-frame and having a tapered interior configured to receive and to compress the tractor chassis rearward end as the chassis end is seated within the member.

11. The conversion apparatus of claim 6 wherein said rails are each divided into a first member secured to the tractor chassis and a second member detachably mounted to the chassis between said first member and the fifth wheel.

12. The conversion apparatus of claim 6 further comprising guide plates attached to the sub-frame and extending alongside the rails.

13. The conversion apparatus of claim 6 further comprising guide plates attached to the sub-frame and extending alongside the main frame.

14. Conversion apparatus for adapting a trailer-towing tractor having a chassis and a fifth wheel to carry a truck bed, comprising:
   a pair of rails each divided into a first rail member detachably mounted to the tractor chassis in front of the fifth wheel and a second rail member permanently attached to the chassis adjacent said first rail member;
   a main frame configured to engage the underside of the truck bed;
   a sub-frame, pivotally coupled to the main frame, having an upper portion configured to support the main frame and a bottom portion configured to rest on the rails, the tractor fifth wheel, and a portion of the tractor chassis, and further including a kingpin configured to engage the tractor fifth wheel;
   forward latch-up means, attached to a forward end of the second rail members, for engaging a forward end of the sub-frame;
   rear latch-up means, attached to the sub-frame, for engaging a rearward portion of the tractor chassis behind the fifth wheel;
   a plurality of first guide plates attached to the sub-frame and oriented so as to extend alongside the rails; and
   a plurality of second guide plates attached to the sub-frame and oriented so as to extend alongside the main frame, wherein a trailer-towing tractor may alternatively be used to mount a truck bed or tow a trailer.

15. A conversion apparatus for adapting a tractor, having a chassis and a fifth wheel for hauling trailers, to transport a truck bed, comprising:
   at least two rails attached to the tractor chassis ahead of the fifth wheel;
   a frame configured to engage the truck bed and to rest on the rails; and
   forward latch-up means, attached to the rails, for securing a forward end of the frame to the rails;
   a kingpin, attached to the frame, configured to engage the fifth wheel, wherein a tractor suitable for towing heavy-load trailers can be converted to carry the truck bed with the weight of the truck bed supported by the tractor chassis along the length of the bed.

16. The conversion apparatus of claim 15 further comprising rear latch-up means, attached to the frame, for securing a rearward end of the frame to the tractor chassis.

17. The conversion apparatus of claim 16 wherein said rear latch-up means includes a hollow segment attached to the rearward end of the frame and having a tapered interior configured to receive and to compress the tractor chassis rearward end.

18. The conversion apparatus of claim 15 wherein said rails are each divided into a first member detachably mounted to the tractor chassis proximate the fifth wheel and a second member secured to the chassis adjacent said first member.

19. The conversion apparatus of claim 15 further comprising guide plates attached to the sides of the frame and projecting alongside the rails.

* * * * *